H. C. BABEL.
CUSHIONED TIRE.
APPLICATION FILED JULY 11, 1918.

1,378,832.

Patented May 24, 1921.

Inventor
Henry C. Babel,

Attorney

UNITED STATES PATENT OFFICE.

HENRY CLAY BABEL, OF BUFFALO, NEW YORK.

CUSHIONED TIRE.

1,378,832.  Specification of Letters Patent.  Patented May 24, 1921.

Application filed July 11, 1918. Serial No. 244,459.

*To all whom it may concern:*

Be it known that I, HENRY CLAY BABEL, a citizen of the United States, residing at Buffalo, in the county of Erie and State of New York, have invented certain new and useful Improvements in Cushioned Tires, of which the following is a specification.

The invention relates to improvements in cushioned tires.

An object of the present invention is to improve the construction of cushioned tires and to provide a simple, practical and efficient cushioned tire designed for use in connection with resilient rims and adapted to dispense with an inner tube and thereby eliminate punctures, blowouts and similar tire troubles.

A further object of the invention is to provide a tire of this character cushioned pneumatically and equipped with air chambers or cells not liable to puncture and which in event of a puncture would not materially lessen the resiliency of the tire.

It is also an object of the invention to provide a cushioned tire equipped with a relatively large number of independent air chambers or cells adapted in event of a puncture to refill automatically with air after the pressure has been removed from the punctured portion of the tire.

With these and other objects in view, the invention consists in the construction and novel combination and arrangement of parts hereinafter fully described, illustrated in the accompanying drawing, and pointed out in the claim hereto appended, it being understood that various changes in the form, proportion, size and minor details may be resorted to without departing from the spirit or sacrificing any of the advantages of the invention.

Figure 3:
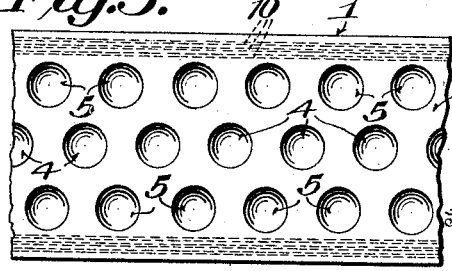
Fig. 3 is a detail reverse plan view of a portion of the tire illustrating the arrangement of the air cells or chambers.

In the accompanying drawing, in which like numerals of reference designate corresponding parts in the several figures, 1 designates a tire approximately segmental in cross section having a rounded tread 2 and a plane inner face or periphery 3 and provided with central and side air cells or chambers 4 and 5 arranged in staggered relation as clearly shown in Fig. 3 of the drawing. The tire 1 which is constructed of rubber, rubber and fabric, or similar tire material, has a relatively thick solid outer circumferential tread portion and the outer face of the tire may be of any desired configuration to provide either the smooth or non-skid tire. The side faces of the cushioned tire are plane and slidably fit between straight side portions 7 of a metallic rim 8 which is approximately U-shaped in cross section but which may be of any configuration.

The central air cells or chambers are deeper or longer than the side air cells or chambers and the said cells or chambers 4 and 5 terminate at the relatively thick solid circumferential tread portion of the tire and they are closed and sealed at their inner ends by a circumferential sealing liner 9 of any suitable material. The sealing liner is secured to the inner face or periphery of the tire and the air cells or chambers are closed at their inner ends before the tire is applied to the rim. The solid tread portion of the tire is interposed between the road surface and the cells or chambers so that the latter are not liable to be punctured but in the event of puncture of any one of the air cells or chambers the cushioning effect will not be materially reduced, as there will be no perceptible loss of air owing to each air chamber or cell being less than one per cent. of the total, and the surrounding tire structure, through its resiliency, will cause the punctured air cell or chamber to refill immediately after the punctured portion of the tire has been relieved of pressure by the rotary movement of the wheel carrying such portion upward from the ground.

The cushion tire is provided at opposite sides adjacent to its inner peripheral face or base with wire cables 10 or other suitable circumferentially arranged tread elements embodied in the material of the tire and adapted to prevent the same from lifting off the rim in the cushioning action of the tire and springs 11, which coact with the cushion tire to produce the desired wheel resiliency. The tire which extends entirely across the space between the side portions of the rim is arranged on a tire band 12 which is of a width less than the tire so as to have its side edges spaced from the straight side portions of the rim. The tire band which is constructed of resilient metal is of a width greater than the cellular or chambered portion of the tire so as to form a frame base or support for such structure and its side edges are spaced from the side portions of the rim. The springs 11 which are preferably of the elliptical type, but which may be of any design or construction, are interposed between the tire band and the base of the rim and they are of a width less than the tire band. The springs may be mounted within the rim in any desired manner and the rim may be of a single piece or sectional structure to facilitate the mounting of the tire thereon and its removal therefrom. An ordinary tire will be equipped with approximately two hundred and fifty of the air cells or chambers and these with the cushioning action of the springs will be ample to afford the desired resiliency and the size and strength of the tire and the springs may be varied to suit the various types of the vehicle to which the tire is designed to be applied.

Figure 1:
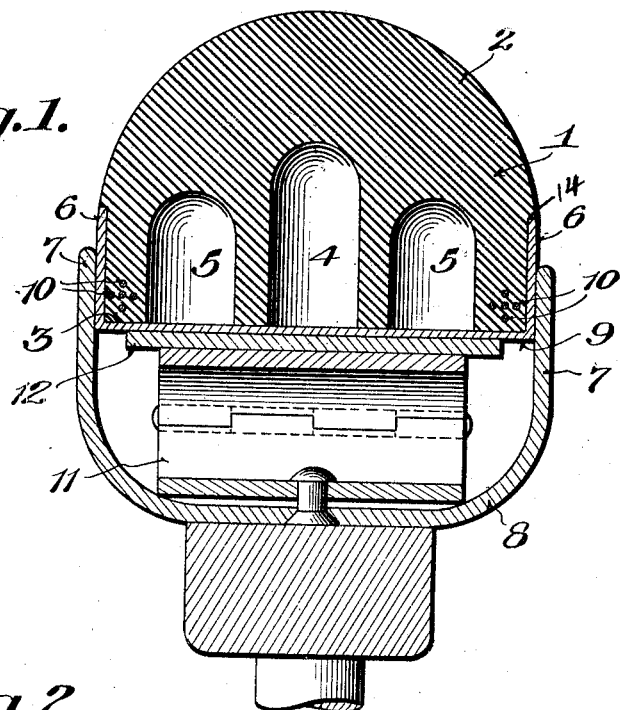
Figure 1 is a transverse sectional view of a cushioned tire constructed in accordance with this invention.
Figure 2:
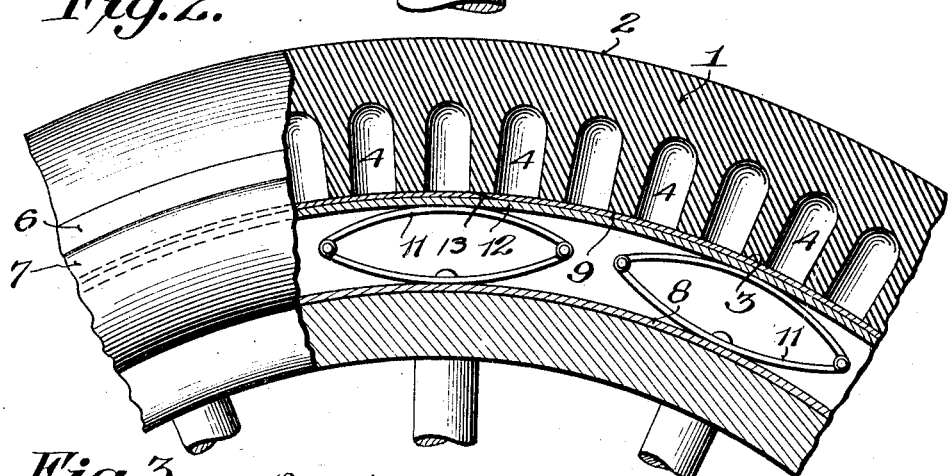
Fig. 2 is a longitudinal sectional view of a portion of the same.

The circumferential liner which seals the air cells or chambers and which is preferably made of rubberized canvas is cemented to the inner periphery of the tire and its ends are beveled or scarfed and overlapped as shown at 13 and the side edges of the circumferential sealing strip are extended and cemented against the side faces of the tire to form flanges 6 for taking up the wear due to the inward and outward movement of the tire. The side portions or flanges 6 are preferably arranged in flush relation with the side faces of the tire as clearly shown in Fig. 1 and the said circumferential sealing liner may be of any desired thickness. Recesses 14 of greater or less depth may be provided to receive the outturned side portions of the circumferential sealing liner.

When the tire is arranged on the resilient tire band, the latter expands the tire and the tire band 12 is of a width greater than the width of the area of the air cells or chambers and adapted to support and reinforce the circumferential liner or sealing strip, so that the air pressure within the cells or chambers, due to the compression of the tire, will not affect or force the said sealing strip or liner away from the inner peripheral face or base of the tire and cause leakage of the air at the inner ends of the air chambers or cells. Owing to this particular construction and arrangement a relatively thin circumferential sealing strip may be employed without danger of bursting or leakage.

What is claimed is:—

The combination of a rim substantially U-shaped in cross section, a tire having a solid tread portion and solid side portions forming continuations of the solid tread portion to provide a substantially solid arch, said tire being also provided with central and side rows of air cells extending from the base of the tire toward the solid tread thereof, the central row being extended outwardly beyond the side rows, a sealing sheet extending across the base of the tire and sealing the air cells and having outturned marginal portions extending beyond the edges of the sides of the rim, annular retaining members embedded in the solid side portions of the tire and located in the angles formed by the marginal portions of the sealing sheet, a resilient band located within the rim and being of a width to extend laterally beyond the said air cells to reinforce the sealing sheet and protect said sheet against excessive pressure in the cells incident to compression of the tire and yieldable means located wholly within the area of the air cells and mounted within the rim and exerting a constant outward pressure against said resilient band to hold the same firmly against said sealing sheet and forcing said band and said sheet and said tire normally away from the bottom of the rim.

In testimony whereof I affix my signature.

HENRY CLAY BABEL.